United States Patent
Adams et al.

(10) Patent No.: US 11,394,766 B2
(45) Date of Patent: Jul. 19, 2022

(54) SYSTEMS AND METHODS FOR ESTABLISHING, USING, AND RECOVERING UNIVERSAL DIGITAL IDENTIFIERS

(71) Applicant: Wells Fargo Bank, N.A., San Francisco, CA (US)

(72) Inventors: Chad E. Adams, Fairview Heights, IL (US); Daniel Robert Caricato, Fort Mill, SC (US); Kahlidah B. Covington, Kannapolis, NC (US); Ashley Brook Godfrey, Chambersburg, PA (US); Christopher Wayne Howser, Concord, NC (US); Nicola A. Maiorana, Charlotte, NC (US); Nirali J. Patel, Pineville, NC (US); Richard Joseph Schroeder, Charlotte, NC (US); Roger Daryll White, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 122 days.

(21) Appl. No.: 16/849,574

(22) Filed: Apr. 15, 2020

(65) Prior Publication Data
US 2021/0329058 A1    Oct. 21, 2021

(51) Int. Cl.
*H04L 67/02* (2022.01)
*G06Q 20/20* (2012.01)
(Continued)

(52) U.S. Cl.
CPC .............. *H04L 67/02* (2013.01); *G06Q 20/20* (2013.01); *H04L 63/0428* (2013.01);
(Continued)

(58) Field of Classification Search
CPC ..... H04L 67/02; H04L 63/0428; H04L 63/08; G06Q 20/20; G06Q 20/409; H04W 76/11; H04W 48/16; H04W 12/06; H04W 12/72
See application file for complete search history.

(56) References Cited

U.S. PATENT DOCUMENTS

| 8,554,685 B2 | 10/2013 | Patterson et al. |
| 8,925,056 B2 | 12/2014 | Nikankin |

(Continued)

FOREIGN PATENT DOCUMENTS

| CN | 108259472 A | 7/2018 |

OTHER PUBLICATIONS

"Combining Frictionless Risk-based Authentication with Comprehensive Strong Customer Authentication for an Enhanced Customer Experience", ThreatMetrix, (2019), 2 pgs.

(Continued)

*Primary Examiner* — Asghar H Bilgrami
(74) *Attorney, Agent, or Firm* — Schwegman Lundberg & Woessner, P.A.

(57) ABSTRACT

Disclosed herein are systems and methods for establishing, using, and recovering universal digital identifiers. In an embodiment, a system establishes a universal identifier (ID) associated with a user and a device of the user. The universal ID is universal with respect to a plurality of distinct entities, has at least a suspended state and an unsuspended state, and initially is in the unsuspended state. The system transmits the universal ID to the device of the user. Thereafter, the system detects an ID-suspension event in connection with the universal ID, and responsively suspends the universal ID, including placing the universal ID in the suspended state. After suspending the universal ID, the system completes an ID-recovery process for the universal ID, and (Continued)

responsively unsuspends the universal ID, including placing the universal ID in the unsuspended state.

20 Claims, 5 Drawing Sheets

(51) Int. Cl.
    *H04L 9/40*     (2022.01)
    *G06Q 20/36*     (2012.01)
    *H04W 12/06*     (2021.01)
    *H04W 48/16*     (2009.01)
    *H04W 76/11*     (2018.01)
    *H04W 12/72*     (2021.01)
    *G06Q 20/40*     (2012.01)

(52) U.S. Cl.
    CPC ............ *H04L 63/08* (2013.01); *H04W 12/06* (2013.01); *H04W 48/16* (2013.01); *H04W 76/11* (2018.02)

(56) References Cited

U.S. PATENT DOCUMENTS

| | | | |
|---|---|---|---|
| 10,063,654 B2 | 8/2018 | Kirti et al. | |
| 10,116,677 B2 | 10/2018 | Faulkner et al. | |
| 10,257,226 B2 | 4/2019 | Drummond et al. | |
| 10,397,267 B2 | 8/2019 | Murphy et al. | |
| 10,860,703 B1 * | 12/2020 | Manwiller | H04L 63/0876 |
| 2013/0268444 A1 * | 10/2013 | Namgoong | H04L 63/0838 |
| | | | 705/71 |
| 2015/0228004 A1 | 8/2015 | Bednarek et al. | |
| 2016/0219039 A1 * | 7/2016 | Houthooft | H04W 12/068 |
| 2017/0235955 A1 * | 8/2017 | Barkan | G06F 21/57 |
| | | | 726/11 |
| 2017/0279836 A1 | 9/2017 | Vasseur et al. | |
| 2018/0270065 A1 * | 9/2018 | Brown | G06F 21/6218 |
| 2018/0288063 A1 | 10/2018 | Koottayi et al. | |
| 2018/0343265 A1 | 11/2018 | Mcmillan et al. | |
| 2019/0036970 A1 | 1/2019 | Shih et al. | |
| 2019/0057201 A1 | 2/2019 | Sahoo | |
| 2019/0065470 A1 | 2/2019 | Matthews et al. | |
| 2019/0081961 A1 | 3/2019 | Bansal | |
| 2019/0273746 A1 | 9/2019 | Coffing | |
| 2019/0318122 A1 * | 10/2019 | Hockey | H04W 12/084 |
| 2021/0004454 A1 * | 1/2021 | Chester | H04L 63/083 |
| 2021/0044976 A1 * | 2/2021 | Avetisov | H04L 9/3218 |
| 2021/0058395 A1 * | 2/2021 | Jakobsson | H04L 67/306 |
| 2021/0226812 A1 * | 7/2021 | Park | H04L 12/2827 |
| 2021/0288981 A1 * | 9/2021 | Numainville | H04L 63/0815 |

OTHER PUBLICATIONS

"Empowering Smarter Authentication and Fraud Decisioning", ThreatMetrix, (2017), 2 pgs.

Kozak, Aron, "Biometrics and digital identity—Is that really you?", Signacat, [Online]. Retrieved from the Internet: <URL: https://www.signicat.com/resources/biometrics-and-digital-identity-is-that-really-you>, (Mar. 13, 2019), 4 pgs.

Muppidi, Sridhar, "Threat-aware Identity and Access Management", IBM Security Systems, (2014), 27 pgs.

* cited by examiner

SYSTEMS AND METHODS FOR ESTABLISHING, USING, AND RECOVERING UNIVERSAL DIGITAL IDENTIFIERS

BACKGROUND

Billions of people around the world use various different communication and computing devices on a daily basis for many different purposes such as social networking, conducting personal business (e.g., financial transactions), conducting work-related activities, online shopping, browsing the web and/or engaging in other forms of Internet communication for entertainment purposes or to gather the news of the day, and/or the like. Indeed, digital communications and computing have become increasingly ubiquitous presences in modern life, and that trend is only expected to continue.

With the increased use and pervasiveness of digital communications and computing comes increased complexity. As an example, a financial-services institution may interact with its customers many billions of times per year in ways such as in person at storefront locations (e.g., banks), online (via, e.g., web portals, mobile applications ("apps"), and/or the like), at automated teller machines (ATMs), on the telephone, and/or the like. There are many organizations, such as large, complex, multinational corporations (including financial-services institutions), that operate and manage large, complex information technology (IT) ecosystems for both internal operations and for customer-facing activities, among other purposes. These ecosystems typically contain many different interoperating systems, servers, applications, interfaces, and the like. It is important to such organizations and their customers that these ecosystems operate reliably and effectively.

One ongoing, seemingly ever-present threat to the continued reliable and effective operation of these ecosystems— and indeed of many online systems and other resources—is the repeated attempts by nefarious actors to gain access (e.g., log in) to these systems, attempting to appear to such systems to be valid, authorized users. These malicious login attempts are carried out by both actual people and by programs (e.g., so-called "bots") that these bad actors create or at least use. These attackers, including both people and bots, are persistent, and continue to adjust their attack strategies in an effort to circumvent defensive measures. They often obtain lists that may or may not contain identifiers (e.g., usernames) of valid users of a system. Their attacks are accordingly often aimed at attempting to narrow such lists down to those identifiers that are associated with valid accounts, which the attackers then try to exploit in some manner. IT teams, fraud-prevention teams, and/or others count among their goals to protect their respective ecosystems, and thus their customers, against fraudulent access (e.g., login) attempts and other threats.

OVERVIEW

Among other inspirations and motivations, the present systems and methods arise in part from the realization and recognition that there are many entities that each carry their own burden of implementing a user-authentication system for purposes that include managing system access, threat detection, and/or one or more other purposes. Such entities include financial-services institutions, other types of companies, divisions of companies, universities, social networks, and/or the like. Each such entity may maintain a valid digital identifier for each valid user of the entity's system. Each such digital identifier could take the form of a user-name or a digital certificate, among other options. For a given access attempt, a given entity may receive the corresponding digital identifier along with one or more additional data items for purposes of authenticating the corresponding digital identifier. Such data items could include a password, one or more biometric values (e.g., a fingerprint), an answer to a challenge question, a one-time password (that, e.g., is texted to a mobile device of the corresponding user), and/or the like. Maintaining a one-entity authentication system is not only expensive for the given entity, it can also be inadequate, as other entities are often aware of threats of which the given entity is not yet aware. Such threats include attack signatures, IP addresses associated with authentication attacks, and/or the like.

To address the above-described issues as well as others, disclosed herein are systems and methods for establishing, using, and recovering universal digital identifiers. In an embodiment, a universal-ID manager provides an independent and robust identification scheme that may reduce the burden of user authentication for participating entities (e.g., financial-services institutions). As described herein, a universal-ID manager may establish a universal digital identifier that is uniquely associated with a combination of a user and a particular device (e.g., a smartphone) of that user. In some embodiments, the universal-ID manager acts as a sort of clearinghouse that maintains validated user identifiers— referred to herein as universal IDs—that are derived by the universal-ID manager from both user and device information. These universal IDs may be trusted by participating entities; as such, reduced authentication processing may be invoked by participating entities for users for which the universal-ID manager has established a corresponding universal ID. Thus, authentication processing may be reduced for some users while standard or elevated authentication processing may be enforced for other users. Among other benefits, such an approach can result in a reduction of authentication processing as an overall matter for a participating entity, or in enhanced threat detection, or both.

A given universal ID may take the form of a digital certificate or a character string, among other options. In some cases, a given universal ID is a result of a function (e.g., a hash function) operating on user-identifying information and device-identifying information. In some such instances, such a function also takes as input one or more additional data values that would not be known to a would-be attacker. Those one or more additional data values are sometimes referred to as "salt," and the corresponding hash function as a "salted hash."

Once established by the universal-ID manager (via, e.g., a registration process such as that described herein), a universal ID (e.g., a digital certificate) may be transferred to (e.g., downloaded by) the corresponding user device. This can occur as part of an app being downloaded by the device from the universal-ID manager, for example upon presentation of a biometric value (e.g., a fingerprint) and a correct password. The universal ID can then be registered in connection with the user with one or more of the participating entities (e.g., financial-services institutions), which may validate the universal ID via the universal-ID manager. The universal ID could thereafter be used to authenticate the user and device to such a participating entity for online banking, purchases, and/or the like. The universal ID could be used to authenticate the user and device for point-of-sale transactions, with payer networks, and for other purposes. Point-of-sale transactions could involve the use of near field communications (NFC), Bluetooth, and/or the like.

Moreover, in embodiments of the present disclosure, upon detection (e.g., notification from a participating entity) of what is referred to herein as an ID-suspension event in connection with a given universal ID, the universal-ID manager may suspend that universal ID. Example ID-suspension events include the corresponding user device being reported lost, the corresponding user device being reported stolen, an anomaly occurring in presented biometric data, an anomaly occurring in user activity (e.g., spending activity) as compared with historical data, and/or the like. The universal-ID manager may notify each of the participating entities of the suspension of the universal ID. This may result in one or more of the participating entities preventing any and all authentications, transactions, and/or the like in connection with that universal ID. In some cases, one or more participating entities may instead limit a per-transaction monetary amount that is permitted while the universal ID is suspended, a cumulative monetary amount of transactions that is permitted while the universal ID is suspended, and/or the like.

Additionally, in embodiments of the present disclosure, upon completion of an ID-recovery process in connection with the universal ID, the universal-ID manager may unsuspend (e.g., reinstate, reauthorize, reactivate, and/or the like) the universal ID. In different embodiments, the ID-recovery process takes different forms. The process could be online and/or in person, as examples, and could involve the receipt from the user of one or more data items (e.g., a one-time password communicated from the universal-ID manager to the user via a supplemental communication channel such as a phone call, an e-mail, a physical mailing, and/or the like). The process could instead or in addition involve receipt from the user of one or more authentication documents such as a driver's license, a passport, and/or the like. The ID-recovery process could be conducted with respect to the same user device (in the case of, e.g., the device having been lost and then found) or a replacement (or simply other) user device (in the case of, e.g., the original device having been stolen and not located, lost and not found, or the like). Once the ID-recovery process has been completed, the user may then resume using the universal ID for authentication, for transactions, and/or the like in the manner in which the user was using the universal ID prior to it being suspended.

One example embodiment takes the form of a method that includes establishing a universal ID associated with a user and a device of the user. The universal ID is universal with respect to a plurality of distinct entities. The universal ID has at least a suspended state and an unsuspended state, and is initially in in the unsuspended state. The method also includes transmitting the universal ID to the device of the user. The method further includes, after transmitting the universal ID to the device of the user, detecting an ID-suspension event in connection with the universal ID, and responsively suspending the universal ID at least in part by placing the universal ID in the suspended state. The method also includes, after suspending the universal ID, completing an ID-recovery process for the universal ID, and responsively unsuspending the universal ID at least in part by placing the universal ID in the unsuspended state. In at least one embodiment, each of these operations is carried out by a processor. In at least one such embodiment, each of these operations is carried out by the same processor.

Another embodiment takes the form of a system that includes at least one processor, and that also includes one or more non-transitory computer readable storage media (CRM) containing instructions executable by the at least one processor for causing the at least one processor to perform at least the operations that are listed in the preceding paragraph. Still another embodiment takes the form of one or more non-transitory CRMs containing instructions executable by at least one processor for causing the at least one processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
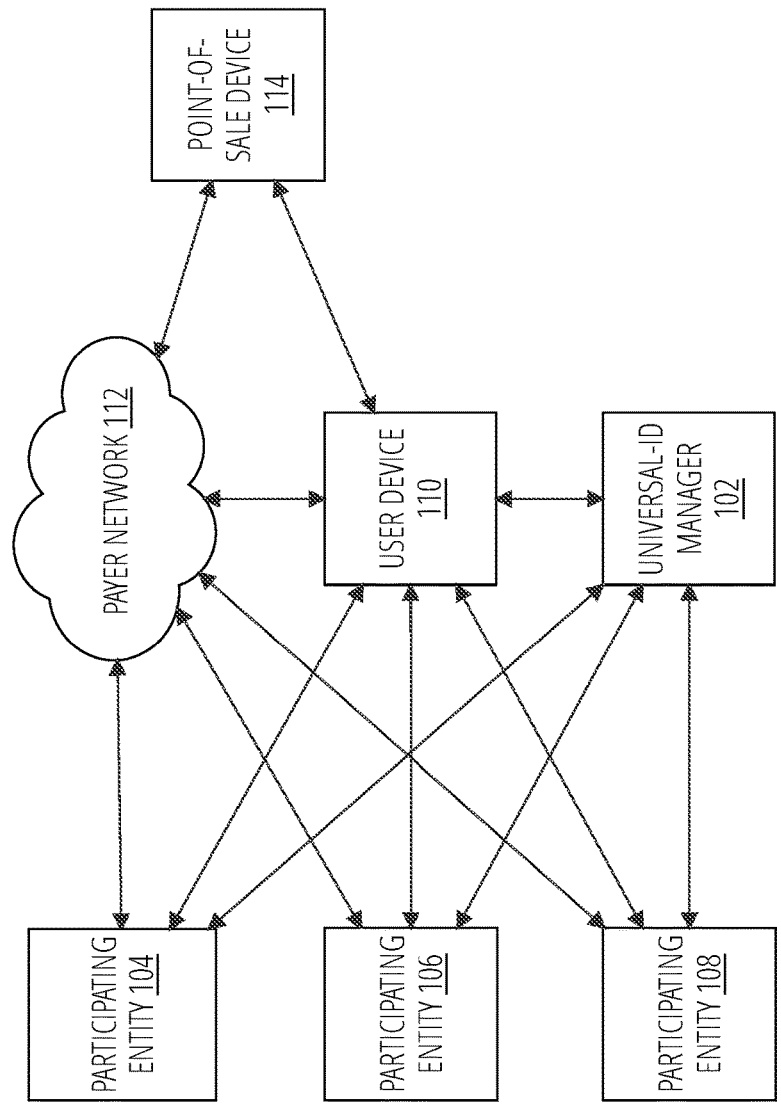
FIG. 1 illustrates an example communication context, in accordance with at least one embodiment.

FIG. 1 illustrates an example communication context 100 in which at least one embodiment of the present disclosure can be carried out. The communication context 100 is provided by way of example and not limitation, as embodiments of the present disclosure can be carried out in numerous different types of communication contexts having different numbers, types, and/or arrangements of devices, systems, entities, and/or the like. There could be fewer or more than the three participating entities that are depicted in FIG. 1. There could be many other user devices having similar connectivity with various different entities, devices, systems, networks, and/or the like. There could be many more than one point-of-sale device. There could be multiple different payer networks. There could be other differences as well.

In at least one embodiment, the universal-ID manager 102 includes a server or server system having at least one communication interface, at least one processor, and data storage containing instructions executable by the at least one processor for performing at least the universal-ID-manager functions described herein. In many of the examples that are described herein, the three depicted participating entities represent the computing and communication systems of three distinct financial-services institutions. In an example situation, a user of the user device 110 maintains a financial account and corresponding online account with each of the three depicted participating entities, and uses a single universal ID in accordance with the present disclosure to authenticate to each of those online accounts. Any one or more of the participating entities could instead be a company (e.g., an online retailer), a division (e.g., business unit) of a company, another type of organization, a university, a social network, and/or the like.

The user device 110 could be a smartphone, a tablet computer, a laptop computer, or any other device that is suitably equipped, programmed, and configured to participate in the systems and methods of the present disclosure. In an embodiment, the point-of-sale device 114 is an ISC480 Signature Capture Payment Terminal provided by Ingenico, headquartered in Paris, France. In other embodiments, other point-of-sale devices could be used. The payer network 112 could be operated by PayPal, Venmo, Zelle, Visa, Mastercard, Discover, and/or any other payer-network operator.

Any of the devices, systems, and the like that are depicted in FIG. 1 and/or in any of the other figures could have an architecture similar to that described below in connection with the example machine 400 of FIG. 4 and could contain and execute software having an architecture similar to that described below in connection with the example software architecture 502 of FIG. 5. Moreover, any of the communication links depicted in FIG. 1 and/or in any of the other figures could be or include one or more wired-communication links (e.g., Ethernet, fiber optic, Universal Serial Bus (USB), and/or the like) and/or one or more wireless-communication links (e.g., Wi-Fi, LTE, NFC, Bluetooth, Bluetooth Low Energy, and/or the like). Any one or more of the communication links could include one or more intermediate devices such as one or more routers, bridges, servers, access points, base stations, and/or the like. Additionally, any communication link could include one or more virtual private networks (VPNs) and/or other tunneling-type connections.

As depicted in FIG. 1, there are communication links between the universal-ID manager 102 and each of the three depicted participating entities, between the user device 110 and each of the three depicted participating entities, between the payer network 112 and each of the three depicted participating entities, between the universal-ID manager 102 and the user device 110, between the user device 110 and the payer network 112, between the user device 110 and the point-of-sale device 114, and between the payer network 112 and the point-of-sale device 114. The set of communication links that is depicted in FIG. 1, however, is not meant to be exhaustive. In various different arrangements, one or more of the depicted communication links may not be present and one or more others that are not depicted could be present. Moreover, two or more of the depicted communication links could overlap at least in part. For example, two or more of the depicted communication links could traverse a common network.

Figure 2:
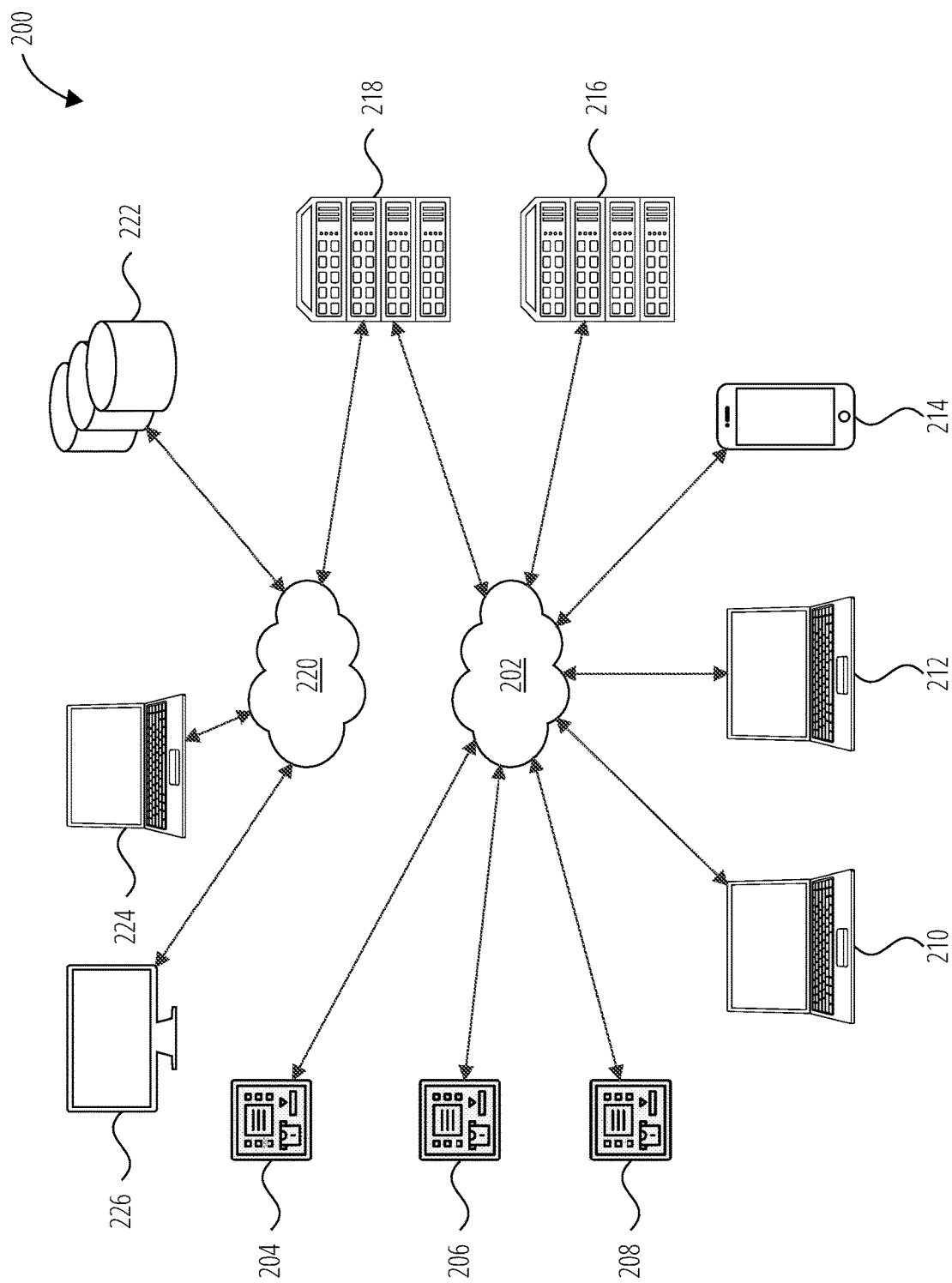
FIG. 2 illustrates an example network arrangement of an example financial-services institution, in accordance with at least one embodiment.

FIG. 2 illustrates an example network arrangement 200 of an example financial-services institution. In an embodiment, the example financial-services institution corresponds to the participating entity 104 of FIG. 1. The network arrangement 200 is provided by way of example and not limitation, as a network arrangement of a given participating entity could have different numbers, types, and/or arrangements of devices, systems, networks, and/or the like.

In the example network arrangement 200 that is depicted in FIG. 2, a number of different devices, systems, and the like are communicatively connected with a network 202 via respective communication links. These include an ATM 204, an ATM 206, an ATM 208, a laptop computer 210, a laptop computer 212, a mobile device 214, a server system 216, and a server system 218. In the depicted example, the server system 218 is also communicatively connected with a network 220. Also connected with the network 220 are a data-store system 222, a laptop computer 224, and a desktop computer 226. In at least one embodiment, only a subset of the devices, systems, and networks that are depicted in FIG. 2 are actually part of and managed by the participating entity 104. An example such subset includes the ATM 204, the ATM 206, the ATM 208, the server system 218, the network 220, the data-store system 222, the laptop computer 224, and the desktop computer 226. In an embodiment, the mobile device 214 corresponds to the user device 110 of FIG. 1. In at least one embodiment, the server system 216 corresponds to the universal-ID manager 102 of FIG. 1.

In an example scenario, the network 202 could be a data-communication network such as, including, or in communication with the Internet. The network 202 could operate according to a suite of communication protocols such the Transmission Control Protocol (TCP) over the Internet Protocol (IP) (collectively, TCP/IP), the User Datagram Protocol (UDP) over IP (UDP/IP), and/or others. Furthermore, the network 220 could be a private IP network operated by the participating entity 104. In addition to other functions, the server system 218 could provide network-access-server (NAS) functions, gateway services, firewall protections, and/or the like between the network 202 and the network 220. Any of the devices in communication with the network 202, such as one or more of the ATM 204, the ATM 206, the ATM 208, the laptop computer 210, and/or the server system 216, as examples, could communicate via the network 202 and the server system 218 with one or more entities on the network 220, in some cases doing so via a VPN and/or another type of secure-tunneling communication protocol, connection, and/or the like.

Any one or more of the ATM 204, the ATM 206, and the ATM 208 could be an ATM that provides conventional ATM-type services such as cash withdrawal, check deposit, account transfers, balance inquiries, bill pay, and/or the like. Users may access any one or more of the ATM 204, the ATM 206, and the ATM 208 using a secure card, a mobile device such as the mobile device 214 having stored thereon a universal ID, and/or the like, along with provided security credentials such as a personal identification number (PIN), password, passcode, and/or the like. In some implementations, biometric authentication is used by one or more of the ATM 204, the ATM 206, and the ATM 208.

In an embodiment, the server system 218 hosts a web-server application that provides an online-banking web-portal application that can be accessed by devices such as the laptop computer 210, the laptop computer 212, the mobile device 214, and/or the like. As another example, a mobile-banking application could be downloaded to, installed on, and executed by mobile devices such as the mobile device 214, to provide a user of the mobile device 214 access to one or more accounts managed by the participating entity 104.

Moreover, although pictured as data-storage containers, the data-store system 222 could include, in addition to one or more data-storage devices, units, and/or the like, one or more database servers that operate to serve valid requests to carry out database operations with respect to the data-store system 222, where such database operations could include operations to store data, retrieve data, extract data, modify data, update data, remove data, and/or the like. Moreover, although the data-store system 222 is shown as being in a single network location in the network arrangement 200, the data-store system 222 could include multiple different data silos in multiple different geographic and/or network-topology locations.

Figure 3:
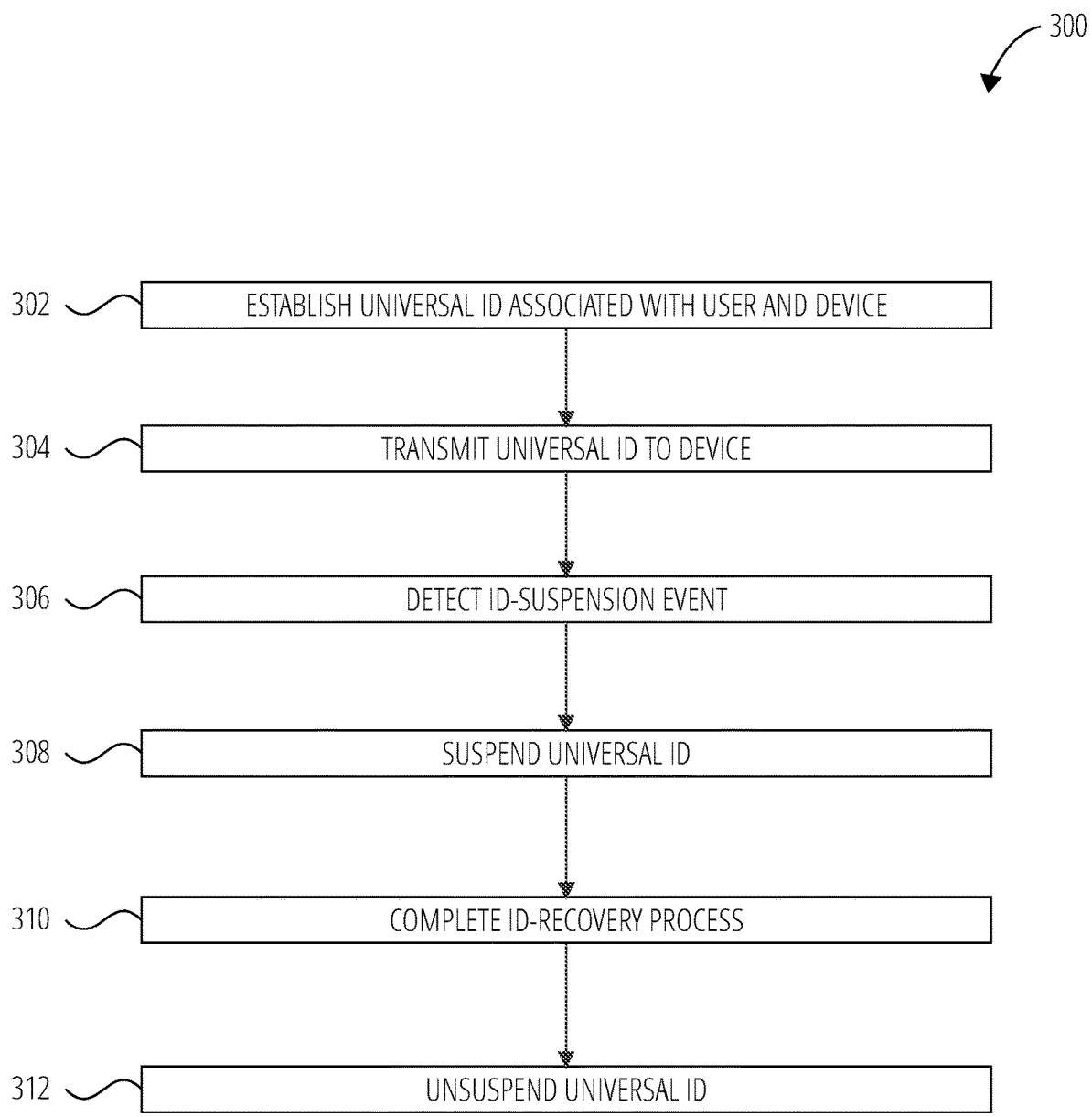
FIG. 3 illustrates an example method, in accordance with at least one embodiment.

FIG. 3 illustrates an example method 300 that includes establishing, suspending, and unsuspending a universal ID in accordance with at least one embodiment of the present disclosure. As a general matter, the method 300 could be performed by any one or any combination of devices, systems, and/or the like that are suitably equipped, programmed, and configured to perform the operations described herein. By way of example and not limitation, the method 300 is described herein as being performed by the universal-ID manager 102. While the method 300 is discussed in more detail below, briefly stated the operations are establishing a universal ID that is associated with both a user and a device of that user (operation 302), transmitting the established universal ID to the user's device (operation 304), detecting an ID-suspension event (operation 306) and responsively suspending the universal ID (operation 308), completing an ID-recovery process in connection with the universal ID (operation 310), and unsuspending the universal ID (operation 312).

At operation 302, the universal-ID manager 102 establishes a universal ID associated with a user and a device of the user, which in this example description is the user device 110. In embodiments of the present disclosure, establishing the universal ID includes the universal-ID manager 102 generating the universal ID and storing it in data storage of the universal-ID manager 102 in association with a profile, account, and/or the like of the corresponding user. The user could opt in to a registration process for establishing the universal ID and select the types of personal data that are stored in connection with the universal ID. In some embodiments, the universal-ID manager 102 utilizes OAuth or another authentication standard in the registration process. Once established, the universal ID is universal with respect to a plurality of distinct entities such as the participating entity 104, the participating entity 106, and the participating entity 108 of FIG. 1. Moreover, the universal-ID manager 102 may store a togglable data value to indicate whether the established universal ID is in a suspended state or an unsuspended state, and may initially set that togglable value to the unsuspended state.

The established universal ID could take a number of different digital forms such as a digital certificate, an alphanumeric character string, a number, and/or the like. In some embodiments, the universal-ID manager 102 generates the universal ID using a hash function or the like. Such a hash function could take as inputs one or more user identifiers that are associated with the user and also one or more device identifiers of the user device 110. Examples of such device identifiers include an electronic serial number (ESN), an international mobile equipment identifier (IMEI), and/or the like. A hash function could also take as input one or more secret values to enhance the security of the universal ID.

The establishing of the universal ID could include an online registration process, perhaps via a web interface. As part of such an online registration process, the universal-ID manager 102 may send an e-mail to an e-mail account controlled by the user, where such an e-mail includes a verify link, a one-time password, and/or the like. The establishing of the universal ID could instead or in addition include an in-person registration process. This could occur at a location—such as an office—that is distinct from and not owned, operated, or controlled by any of the participating entities. In other implementations, one or more locations (e.g., bank branches) that are controlled by one of the participating entities could be a location at which an in-person portion of a registration process occurs.

In some instances, establishing the universal ID includes receipt of one or more proof-of-identity documents associated with the user. Such documents could include a birth certificate, a social security card, a driver's license, a government ID, a military ID, a passport, and/or the like. One or more such documents could be provided by mail or other shipping service, or could be presented in person at a registration location, as examples. An interface could be provided for an operator to enter into the universal-ID manager 102 a confirmation that one or more such valid documents had been presented. In some embodiments, the degree of authentication (e.g., clicking on a verify link in an email vs. in-person presentation of a valid passport, as an example) that is required to establish a universal ID may be commensurate with the type of permissions, transaction types, transaction amounts, and/or the like for which a given universal ID will be usable by a given user.

At operation 304, the universal-ID manager 102 transmits the established universal ID to the user device 110. This could take place in any number of ways. In one example, the universal-ID manager 102 sends a download link to the user device 110 via text message, e-mail, and/or another application, and the user device 110 can then be used to follow the provided link to download the universal ID on to the user device 110. In another example, the universal ID is transmitted to the user device 110 as part of a download of an application to the user device 110. In order to initiate any of these options or another option, a user may first need to provide, via the user device 110, a biometric value and/or a correct password to the universal-ID manager 102. In some cases, the user device 110 may download the universal ID and one or more applications that incorporate the universal ID.

In an example, the user device 110 downloads a standalone identification app for leveraging the universal ID to do things like, e.g., opening a checking account at a participating entity. In such an instance, a user may use such an identification app to prove that they are who they say they are. Instead or in addition, the user device 110 could download a dedicated point-of-sale app that incorporates the universal ID and is usable at point-of-sale locations such as the point-of-sale device 114. As another example, the user device 110 could download the universal ID for integration into an existing point-of-sale app or function such as Apple Pay, Android Pay, Google Pay, Samsung Pay, and/or the like. Such integration into an operating system, function, and/or app on the user device 110 could be facilitated by a mechanism such as an application programming interface (API), a software development kit (SDK), and/or the like. Another possible integration is the integration of the universal ID into an app that is provided by a participating entity (e.g., a financial-services institution), where the universal ID would then be usable by the user for authentication in such an app.

Indeed, once a universal ID has been established for a user-and-device combination and transferred on to the corresponding device, the universal ID can then be registered with a participating entity such as the participating entity 104 for purposes of using the participating entity's own app, online banking via a web portal provided by the participating entity, and/or the like. A user may present the universal ID to the participating entity 104 for registration via an app, via a web portal, in person via a reader at a location of the participating entity 104, or the like. The user may also provide biometric data (e.g., a fingerprint scan) and a password, as examples. The user device 110 may provide a hash of one or more such values to the participating entity 104 for security purposes. The participating entity 104 may seek to validate the universal ID by sending the provided universal ID and authenticating information, perhaps hashed together, to the universal-ID manager 102, which may receive such an ID-validation request and responsively validate the universal ID and provide an ID-validated response to the participating entity 104. The universal-ID manager 102 may validate the universal ID by making a comparison with the data that is provided by the participating entity 104 and data that was stored by the universal-ID manager 102 at the time that the universal ID was established. The universal ID may thereafter be usable by the user via the user device 110 for authentication purposes with the participating entity 104. A similar process may be conducted with respect to both the participating entity 106 and the participating entity 108. Each participating entity may store an association between the universal ID and other identifiers and/or data that the participating entity maintains in connection with the particular user.

In some embodiments, the universal ID is usable to make purchases at point-of-sale devices such as the point-of-sale device 114. NFC, Bluetooth, and/or the like may be used in such instances for communication between the user device 110 and the point-of-sale device 114. Such purchases could involve the universal ID being presented to the point-of-sale device 114 via an integration with a payment function such as Apple Pay, Android Pay, Samsung Pay, Google Pay, and/or the like. In some embodiments, the universal ID may be usable for authentication of transactions made via a payer network such as the payer network 112. Such a payer network may be operated by PayPal, Venmo, Zelle, Visa, Mastercard, Discover, and/or the like. For at least some transactions, 2-factor authentication could be used. For example, a one-time password could be texted to the user device 110 and then provided via an interface (e.g., a web interface) of the payer network 112.

While the universal ID is in the unsuspended state, at least one entity in the plurality of entities may apply a different (e.g., reduced) security protocol to authentication attempts and/or transactions that are associated with a universal ID than to authentication attempts and/or transactions that are not associated with a universal ID. In one example situation, the participating entities could be member institutions in a consortium to combat threats (e.g., fraudulent authentication attempts, endpoint malware, device spoofing, identity theft, etc.) at least in part by sharing threat intelligence information with one another. In this way, the member institutions could cooperate to proactively protect against threats by using threat intelligence information broader than that possessed by any one member institution. In an embodiment, the present systems and methods relate to a universal ID that is a plug in for such a centralized threat repository or threat intelligence system (TIS). Similar to the way in which TSA PreCheck involves sharing of traveler-verification information across airports, embodiments of the present systems and methods involve sharing of digital user-and-device authentication information across multiple entities via a centralized authority. Such entities could include financial-services institutions, other types of businesses, organizations, social networks, and/or the like.

At operation 306, after transmitting the universal ID to the device of the user at operation 304, the universal-ID manager 102 detects what is referred to herein as an ID-suspension event in connection with the universal ID. As examples, the ID-suspension event could include receiving into the universal-ID manager 102 an indication that the user device 110 has been lost or an indication that the user device 110 has been stolen. A user may call a call center to make such a report, and an agent may input this information via a web interface or other interface into the universal-ID manager 102. A user could instead report the user device 110 as lost or stolen via a web interface, an automated call-answering service, and/or one or more other options. Another example type of ID-suspension event is the occurrence of fraudulent activity in connection with the universal ID. Such fraudulent activity could be attempted, successful, unsuccessful, suspected, confirmed, and/or the like. This could be related to detecting an anomaly in biometric data, an anomaly in user activity (e.g., purchasing activity), and/or the like.

At operation 308, responsive to detecting the ID-suspension event at operation 306, the universal-ID manager 102 suspends the universal ID. In an embodiment, the suspending of the universal ID includes placing the universal ID in the suspended state by changing (e.g., toggling) an associated suspension-state data value in a profile maintained by the universal-ID manager 102 in connection with the universal ID. The universal-ID manager 102 may also notify each of the participating entity 104, the participating entity 106, and the participating entity 108 that the universal ID is in the suspended state. In some cases, the universal-ID manager 102 may also place at least one additional universal ID in the suspended state, where that at least one additional universal is associated with at least one additional device of the user.

While the universal ID is in the suspended state, at least one participating entity may deny any attempted authentications and/or transactions associated with the universal ID. In some cases, one or more participating entities may, while the universal ID is in the suspended state, limit a per-transaction and/or cumulative monetary amount that may be conducted using the universal ID. Thus, transactions could be stopped altogether or be limited in some way. In some cases, the universal ID being in the suspended state may result in one or more of the participating entities processing authentication attempts and/or transactions for the associated user using standard or elevated authentication routines. In one example, the user may be asked to answer security questions or provide a verbal passphrase via a telephone call, among other possible options.

In an example scenario, the universal-ID manager 102 receives notification from one participating entity that the universal ID associated with the user and with user device 110 has actually or even possibly been compromised, and the universal-ID manager 102 responsively suspends the universal ID and notifies the participating entities of this action. The user, however, may still be in possession of the user device 110, and may try to use the universal ID via user device 110 to make a purchase. If the amount is low enough, the transaction may be approved. If not, the transaction may be denied. In other implementations, all authentication attempts and attempted transactions may be denied by one or more of the participating entities. And certainly other scenarios are possible as well.

At operation 310, after suspending the universal ID, the universal-ID manager 102 completes an ID-recovery process for the universal ID. The recovery process could be online and/or in person, as examples. In an embodiment, the ID-recovery process includes receiving an ID-verification value from the user that is associated with user device 110. In some cases, the universal-ID manager 102 first transmits that ID-verification value to the user (via, e.g., a secondary communication channel such as a phone call, a text, an email, a physical mailing, and/or the like). The ID-verification value could be a one-time password (e.g., a numeric code). In some implementations, a statement such as a monthly statement has the ID-verification value printed on it, and the user can refer to that statement. The ID-verification value could include an answer to a previously answered secret question. In some cases, the user is issued (via, e.g., email) a set of one or more recovery codes that the user can provide to the universal-ID manager 102 as the ID-verification value. In some implementations, instead of or in addition to one or more of the above-described steps, the user may be required to provide (e.g., in person, via physical mail, fax, and/or the like) one or more originals or copies of one or more proof-of-identity documents such as a birth certificate, a passport, and/or the like. In some embodiments, the ID-verification value includes one or more biometric values (e.g, a fingerprint).

In many instances, the ID-recovery process involves unsuspending (e.g., reinstating, reauthorizing, reactivating, and/or the like) the universal ID on the same device—in this example the user device 110—on which the universal ID was initially established. In other cases, this may not be possible, for example if the user device 110 is lost and not found, stolen and not recovered, and/or the like. In such instances, the ID-recovery process for the universal ID may involve generating a replacement universal ID for a replacement device of the user. The replacement universal ID may be generated with one or more device identifiers of the replacement device in place of the one or more device identifiers of the user device 110 that were used to establish the initial universal ID on the user device 110. The ID-recovery process may also include the universal-ID manager 102 replacing the universal ID with the replacement universal ID in data storage in association with, e.g., a profile for the corresponding user.

At operation 312, responsive to completing the ID-recovery process at operation 310, the universal-ID manager 102 unsuspends the universal ID. In at least one embodiment, the unsuspending of the universal ID includes placing the universal ID in the unsuspended state at least in part by updating (e.g., toggling) an associated suspension-state data value in a profile maintained by the universal-ID manager 102 in connection with the universal ID. The universal-ID manager 102 may also notify each of the participating entity 104, the participating entity 106, and the participating entity 108 that the universal ID is in the unsuspended state. In some cases, the universal-ID manager 102 may also change at least one additional universal ID to the unsuspended state, where that at least one additional universal ID is associated with at last one additional device of the user. Once the universal ID has been unsuspended, the user may use the user device 110 (or a replacement device) to authenticate and transact in the same manner as prior to the suspension.

In some instances, a given user may have multiple devices, each with its own universal ID in accordance with the present disclosure. In some such instances, the universal-ID manager 102 may perform the operations of the method 300 with each such device. Thus, using a second device by way of example and not limitation, the universal-ID manager 102 may establish a second universal ID associated with the user and a second device of the user. Like the first universal ID that is associated with the user device 110, the second universal ID is also universal with respect to the participating entities that are depicted in FIG. 1. The second universal ID can also be placed in at least the suspended state and the unsuspended state, and is initially set in the unsuspended state upon being established. The universal-ID manager 102 may transmit the second universal ID to the second device of the user. After transmitting the second universal ID to the second device of the user, the universal-ID manager 102 may detect a second ID-suspension event in connection with the second universal ID, and responsively suspend the second universal ID at least in part by placing the second universal ID in the suspended state. The second ID-suspension event could be one of the above-mentioned ID-suspension events and/or one or more other ID-suspension events. After suspending the second universal ID, the universal-ID manager 102 may complete a second ID-recovery process with respect to the second universal ID, and responsively unsuspend the second universal ID at least in part by placing the second universal ID in the unsuspended state. The second ID-recovery process could be the same as or different than the ID-recovery process undertaken with respect to the user device 110. That is, registration (i.e., universal-ID-establishment) processes can be device-specific, as can ID-recovery processes.

Figure 4:
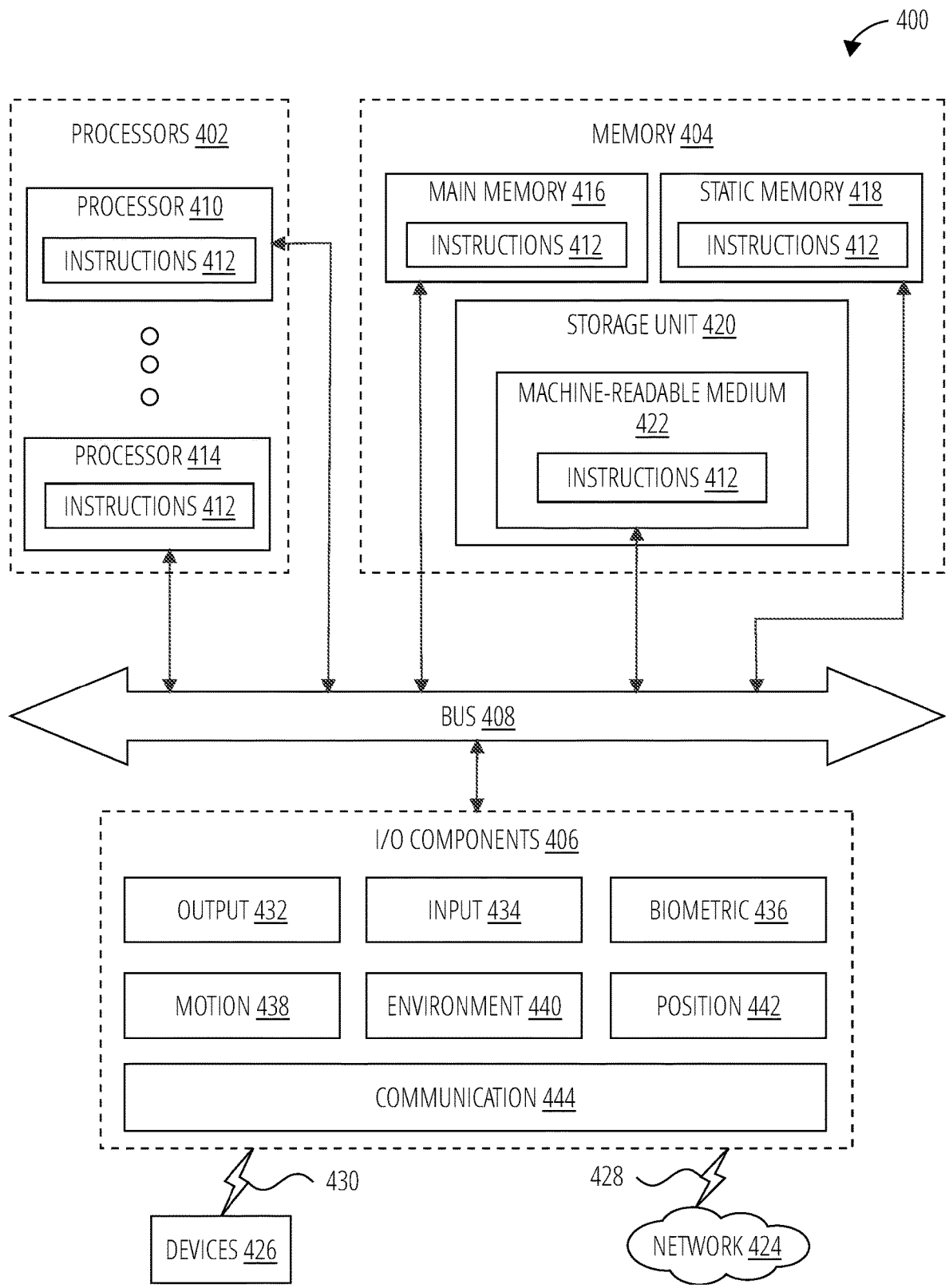
FIG. 4 illustrates a machine in the form of a computer system within which a set of instructions may be executed for causing the machine to perform any one or more of the methodologies discussed herein, in accordance with at least one embodiment.

FIG. 4 is a diagrammatic representation of a machine 400 within which instructions 412 (e.g., software, a program, an application, an applet, an app, and/or other executable code) for causing the machine 400 to perform any one or more of the methodologies discussed herein may be executed. For example, the instructions 412 may cause the machine 400 to execute any one or more of the methods described herein. The instructions 412 transform the general, non-programmed machine 400 into a particular machine 400 programmed to carry out the described and illustrated functions in the manner described. The machine 400 may operate as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may be or include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 412, sequentially or otherwise, that specify actions to be taken by the machine 400. Further, while only a single machine 400 is illustrated, the term "machine" shall also be taken to include a collection of machines that individually or jointly execute the instructions 412 to perform any one or more of the methodologies discussed herein.

The machine 400 may include processors 402, memory 404, and I/O components 406, which may be configured to communicate with each other via a bus 408. In an example embodiment, the processors 402 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 410 and a processor 414 that execute the instructions 412. The term "processor" is intended to include multi-core processors that may include two or more independent processors (sometimes referred to as "cores") that may execute instructions contemporaneously. Although FIG. 4 shows multiple processors 402, the machine 400 may include a single processor with a single core, a single processor with multiple cores (e.g., a multi-core processor), multiple processors with a single core, multiple processors with multiples cores, or any combination thereof.

The memory 404 includes a main memory 416, a static memory 418, and a storage unit 420, all accessible to the processors 402 via the bus 408. The memory 404, the static memory 418, and/or the storage unit 420 may store the instructions 412 embodying any one or more of the methodologies or functions described herein. The instructions 412 may also or instead reside, completely or partially, within the main memory 416, within the static memory 418, within machine-readable medium 422 within the storage unit 420, within at least one of the processors 402 (e.g., within the processor's cache memory), and/or any suitable combination thereof, during execution thereof by the machine 400.

The I/O components 406 may include a wide variety of components to receive input, produce and/or provide output, transmit information, exchange information, capture measurements, and/or the like. The specific I/O components 406 that are included in a particular instance of the machine 400 will depend on the type of machine. For example, portable machines such as mobile phones may include a touch input device or other such input mechanisms, while a headless server machine may not include such a touch input device. It will be appreciated that the I/O components 406 may include many other components that are not shown in FIG. 4. In various example embodiments, the I/O components 406 may include output components 432 and input components 434. The output components 432 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 434 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 406 may include biometric components 436, motion components 438, environmental components 440, and/or position components 442, among a wide array of other components. For example, the biometric components 436 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification, and/or the like), and/or the like. The motion components 438 may include acceleration sensor components (e.g., an accelerometer), gravitation sensor components, rotation sensor components (e.g., a gyroscope), and so forth. The environmental components 440 may include, for example, illumination sensor components (e.g., a photometer), temperature sensor components (e.g., one or more thermometers), humidity-sensor components, pressure-sensor components (e.g., a barometer), acoustic-sensor components (e.g., one or more microphones), proximity-sensor components (e.g., infrared sensors that detect nearby objects), gas sensors (e.g., gas-detection sensors to detection concentrations of hazardous gases for safety or to measure pollutants in the atmosphere), and/or other components that may provide indications, measurements, signals, and/or the like that correspond to a surrounding physical environment. The position components 442 may include location-sensor components (e.g., a global positioning system (GPS) receiver), altitude-sensor components (e.g., altimeters or barometers that detect air pressure from which altitude may be derived), orientation-sensor components (e.g., magnetometers), and/or the like.

Communication may be implemented using a wide variety of technologies. The I/O components 406 may further include communication components 444 operable to communicatively couple the machine 400 to a network 424 and/or devices 426 via a coupling 428 and/or a coupling 430, respectively. For example, the communication components 444 may include a network-interface component or another suitable device to interface with the network 424. In further examples, the communication components 444 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 426 may include one or more other machines and/or any of a wide variety of peripheral devices (e.g., a peripheral device coupled via a universal serial bus (USB) connection).

Moreover, the communication components 444 may detect identifiers or include components operable to detect identifiers. For example, the communication components 444 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 444, such as location via Internet Protocol (IP) geolocation, location via Wi-Fi signal triangulation, location via detecting an NFC beacon signal that may indicate a particular location, and/or the like.

One or more of the various memories (e.g., the memory 404, the main memory 416, the static memory 418, and/or the memory of the processors 402) and/or the storage unit 420 may store one or more sets of instructions and data structures (e.g., software) embodying or used by any one or more of the methodologies or functions described herein. These instructions (e.g., the instructions 412), when executed by processors 402, cause various operations to implement the disclosed embodiments.

The instructions 412 may be transmitted or received over the network 424, using a transmission medium, via a network-interface device (e.g., a network-interface component included in the communication components 444) and using any one of a number of well-known transfer protocols (e.g., the Session Initiation Protocol (SIP), the hypertext transfer protocol (HTTP), and/or the like). Similarly, the instructions 412 may be transmitted or received using a transmission medium via the coupling 430 (e.g., a peer-to-peer coupling) to the devices 426.

Figure 5:
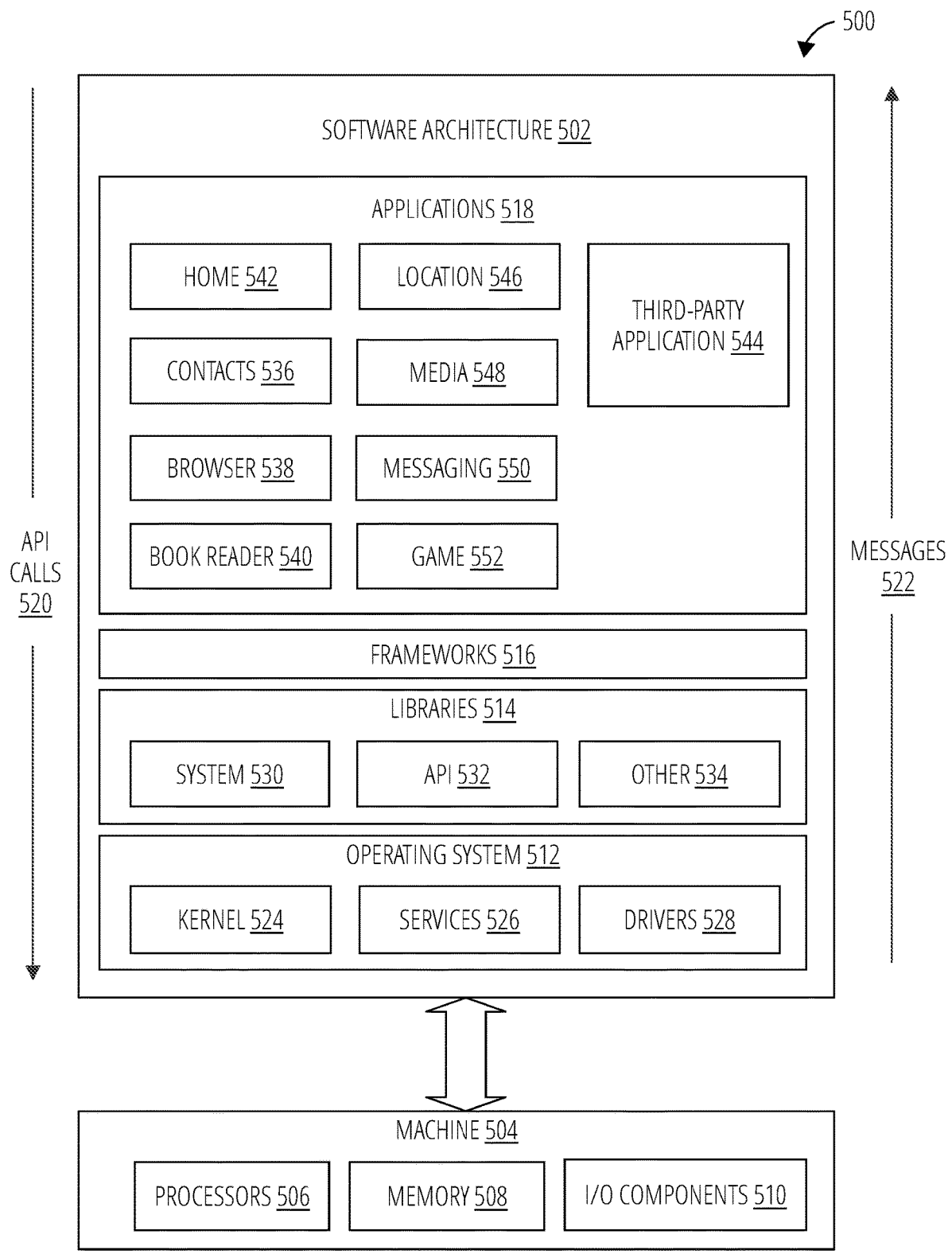
FIG. 5 illustrates a software architecture within which one or more embodiments of the present disclosure may be implemented, in accordance with at least one embodiment.

FIG. 5 is a block diagram 500 illustrating a software architecture 502, which can be installed on any one or more of the devices described herein. For example, the software architecture 502 could be installed on any device or system that is arranged similar to the machine 400 of FIG. 4. The software architecture 502 is supported by hardware such as a machine 504 that includes processors 506, memory 508, and I/O components 510. In this example, the software architecture 502 can be conceptualized as a stack of layers, where each layer provides a particular functionality. The software architecture 502 includes layers such an operating system 512, libraries 514, frameworks 516, and applications 518. Operationally, using one or more application programming interfaces (APIs), the applications 518 invoke API calls 520 through the software stack and receive messages 522 in response to the API calls 520.

The operating system 512 manages hardware resources and provides common services. The operating system 512 includes, for example, a kernel 524, services 526, and drivers 528. The kernel 524 acts as an abstraction layer between the hardware and the other software layers. For example, the kernel 524 may provide memory management, processor management (e.g., scheduling), component management, networking, and/or security settings, in some cases among other functionality. The services 526 can provide other common services for the other software layers. The drivers 528 are responsible for controlling or interfacing with the underlying hardware. For instance, the drivers 528 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 514 provide a low-level common infrastructure used by the applications 518. The libraries 514 can include system libraries 530 (e.g., C standard library) that provide functions such as memory-allocation functions, string-manipulation functions, mathematic functions, and/or the like. In addition, the libraries 514 can include API libraries 532 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in a graphic content on a display), database libraries (e.g., SQLite to provide various relational-database functions), web libraries (e.g., WebKit to provide web-browsing functionality), and/or the like. The libraries 514 can also include a wide variety of other libraries 534 to provide many other APIs to the applications 518.

The frameworks 516 may provide a high-level common infrastructure that is used by the applications 518. For example, the frameworks 516 may provide various graphical user interface (GUI) functions, high-level resource management, high-level location services, and/or the like. The frameworks 516 can provide a broad spectrum of other APIs that can be used by the applications 518, some of which may be specific to a particular operating system or platform.

Purely as representative examples, the applications 518 may include a home application 542, a contacts application 536, a browser application 538, a book-reader application 540, a location application 546, a media application 548, a messaging application 550, a game application 552, and/or a broad assortment of other applications generically represented in FIG. 5 by a third-party application 544. The applications 518 are programs that execute functions defined in the programs. Various programming languages can be employed to create one or more of the applications 518, structured in a variety of manners, such as object-oriented programming languages (e.g., Objective-C, Java, C++, and/or the like), procedural programming languages (e.g., C, assembly language, and/or the like), and/or the like. In a specific example, the third-party application 544 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 544 can invoke the API calls 520 provided by the operating system 512 to facilitate functionality described herein.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A computer-implemented method comprising:
  establishing a universal identifier (ID) associated with a
    user and a device of the user, the universal ID being universal with respect to a plurality of distinct entities, the universal ID having at least a suspended state and an unsuspended state, the universal ID initially being in the unsuspended state;

transmitting the universal ID to the device of the user;

after transmitting the universal ID to the device of the user, detecting an ID-suspension event in connection with the universal ID, and responsively suspending the universal ID, the suspending of the universal ID comprising placing the universal ID in the suspended state; and after suspending the universal ID, completing an ID-recovery process for the universal ID, and responsively unsuspending the universal ID, the unsuspending of the universal ID comprising placing the universal ID in the unsuspended state.

2. The method of claim 1, wherein:
one or more user identifiers are associated with the user; and
establishing the universal ID associated with the user and the device of the user comprises deriving the universal ID from at least the one or more user identifiers and one or more device identifiers of the device of the user.

3. The method of claim 1, wherein the plurality of distinct entities comprises at least two distinct financial-services institutions.

4. The method of claim 1, wherein:
the plurality of distinct entities comprises a first entity; and
the method further comprises receiving, from the first entity, an ID-validation request seeking validation of the universal ID, and responsively validating the universal ID and providing an ID-validated response to the first entity.

5. The method of claim 1, further comprising:
establishing a second universal ID associated with the user and a second device of the user, the second universal ID being universal with respect to the plurality of distinct entities, the second universal ID having at least the suspended state and the unsuspended state, the second universal ID initially being in the unsuspended state;
transmitting the second universal ID to the second device of the user;
after transmitting the second universal ID to the second device of the user, detecting a second ID-suspension event in connection with the second universal ID, and responsively suspending the second universal ID, the suspending of the second universal ID comprising placing the second universal ID in the suspended state; and
after suspending the second universal ID, completing a second ID-recovery process with respect to the second universal ID, and responsively unsuspending the second universal ID, the unsuspending of the second universal ID comprising placing the second universal ID in the unsuspended state.

6. The method of claim 1, wherein transmitting the universal ID to the device of the user comprises transmitting the universal ID to the device of the user as part of a download of an application to the device of the user.

7. The method of claim 1, wherein transmitting the universal ID to the device of the user comprises transmitting the universal ID to the device of the user for incorporation into a point-of-sale function of the device of the user.

8. The method of claim 1, wherein transmitting the universal ID to the device of the user comprises transmitting the universal ID to the device of the user for incorporation on the device of the user into an application associated with an entity in the plurality of entities.

9. The method of claim 1, wherein, while the universal ID is in the unsuspended state, at least one entity in the plurality of entities applies a different security protocol to authentication attempts that are associated with a universal ID than to authentication attempts that are not associated with a universal ID.

10. The method of claim 1, wherein the ID-suspension event comprises the device of the user being reported lost or stolen.

11. The method of claim 1, wherein the ID-suspension event comprises fraudulent activity associated with the universal ID.

12. The method of claim 1, wherein:
the suspending of the universal ID further comprises notifying each of the entities in the plurality of entities that the universal ID is in the suspended state; and
the unsuspending of the universal ID further comprises notifying each of the entities in the plurality of entities that the universal ID is in the unsuspended state.

13. The method of claim 1, wherein the suspending of the universal ID further comprises placing at least one additional universal ID in the suspended state, the at least one additional universal ID being associated with at least one additional device of the user.

14. The method of claim 1, wherein, while the universal ID is in the suspended state, at least one entity in the plurality of entities denies any attempted transaction associated with the universal ID.

15. The method of claim 1, wherein, while the universal ID is in the suspended state, at least one entity in the plurality of entities limits a permissible monetary amount of any attempted transaction associated with the universal ID.

16. The method of claim 1, wherein the ID-recovery process for the universal ID comprises receiving an ID-verification value from the user.

17. The method of claim 16, further comprising transmitting the ID-verification value to the user via a secondary communication channel.

18. The method of claim 1, wherein the ID-recovery process for the universal ID comprises:
generating a replacement universal ID for a replacement device of the user; and
replacing the universal ID with the replacement universal M.

19. A system comprising:
at least one processor; and
one or more non-transitory computer readable storage media containing instructions executable by the at least one processor for causing the at least one processor to perform operations comprising:
establishing a universal identifier (ID) associated with a user and a device of the user, the universal ID being universal with respect to a plurality of distinct entities, the universal ID having at least a suspended state and an unsuspended state, the universal ID initially being in the unsuspended state;
transmitting the universal ID to the device of the user;
after transmitting the universal ID to the device of the user, detecting an ID-suspension event in connection with the universal ID, and responsively suspending the universal ID, the suspending of the universal ID comprising placing the universal ID in the suspended state; and after suspending the universal ID, completing an ID-recovery process for the universal ID, and responsively unsuspending the universal ID, the unsuspending of the universal ID comprising placing the universal ID in the unsuspended state.

20. One or more non-transitory computer readable storage media containing instructions executable by at least one processor for causing the at least one processor to perform operations comprising:

establishing a universal identifier (ID) associated with a user and a device of the user, the universal ID being universal with respect to a plurality of distinct entities, the universal ID having at least a suspended state and an unsuspended state, the universal ID initially being in the unsuspended state;

transmitting the universal ID to the device of the user;

after transmitting the universal ID to the device of the user, detecting an ID-suspension event in connection with the universal ID, and responsively suspending the universal ID, the suspending of the universal ID comprising placing the universal ID in the suspended state; and after suspending the universal ID, completing an ID-recovery process for the universal ID, and responsively unsuspending the universal ID, the unsuspending of the universal ID comprising placing the universal ID in the unsuspended state.

\* \* \* \* \*

UNITED STATES PATENT AND TRADEMARK OFFICE
CERTIFICATE OF CORRECTION

PATENT NO. : 11,394,766 B2
APPLICATION NO. : 16/849574
DATED : July 19, 2022
INVENTOR(S) : Adams et al.

It is certified that error appears in the above-identified patent and that said Letters Patent is hereby corrected as shown below:

In the Claims

Column 18, Line 48, Claim 18, delete "M." and insert --ID.-- therefor

Signed and Sealed this
Eleventh Day of April, 2023

*Katherine Kelly Vidal*

Katherine Kelly Vidal
*Director of the United States Patent and Trademark Office*